United States Patent [19]
Matsuhama

[11] Patent Number: 5,241,874
[45] Date of Patent: Sep. 7, 1993

[54] BALL SCREW

[76] Inventor: Shunichi Matsuhama, Kohnan 1-chome Danchi 711 No. 8-23, Kohnan 1-chome Minato-ku, Tokyo, Japan

[21] Appl. No.: 946,932

[22] Filed: Sep. 17, 1992

Related U.S. Application Data

[63] Continuation of Ser. No. 750,610, Aug. 27, 1991, abandoned.

[30] Foreign Application Priority Data

Nov. 27, 1990 [JP] Japan ................................ 2-320676

[51] Int. Cl.$^5$ ................................................ F16H 25/22
[52] U.S. Cl. ................................ 74/424.8 NA; 74/459
[58] Field of Search ................ 74/424.8 NA, 459, 441

[56] References Cited

U.S. PATENT DOCUMENTS

| | | | |
|---|---|---|---|
| 2,933,941 | 4/1960 | Millns | 74/459 X |
| 3,062,070 | 11/1962 | Beatty et al. | 74/424.8 NA X |
| 3,184,987 | 5/1965 | Beatty | 74/459 X |
| 4,821,592 | 4/1989 | Rousselet | 74/424.8 NA |
| 4,920,817 | 5/1990 | Granbom | 74/424.8 NA |

FOREIGN PATENT DOCUMENTS

| | | | |
|---|---|---|---|
| 328655 | 11/1920 | Fed. Rep. of Germany | 74/459 |
| 725181 | 9/1942 | Fed. Rep. of Germany | 74/459 |
| 60-155052 | 8/1985 | Japan | 74/424.8 NA |
| 121323 | 7/1959 | U.S.S.R. | 74/459 |
| 257935 | 12/1970 | U.S.S.R. | 74/459 |

Primary Examiner—Richard M. Lorence
Attorney, Agent, or Firm—Thomas R. Morrison

[57] ABSTRACT

A ball screw incorporates a screw shaft having a plurality of spiral grooves around its circumference. The spiral grooves are engaged by a plurality of balls in assembly units. The balls in each assembly unit are disposed in a plane that is normal to a longitudinal axis of the screw shaft. Each assembly unit retains its plurality of balls at predetermined rotational positions relative to the bearing main body. In one embodiment, the screw shaft includes two spiral threads, there are two assembly units, each carrying two balls disposed 180 degrees from each other, and the two assembly units are spaced axially to place the balls in one assembly unit at an angle of 90 degrees to the balls in the other assembly unit.

3 Claims, 5 Drawing Sheets

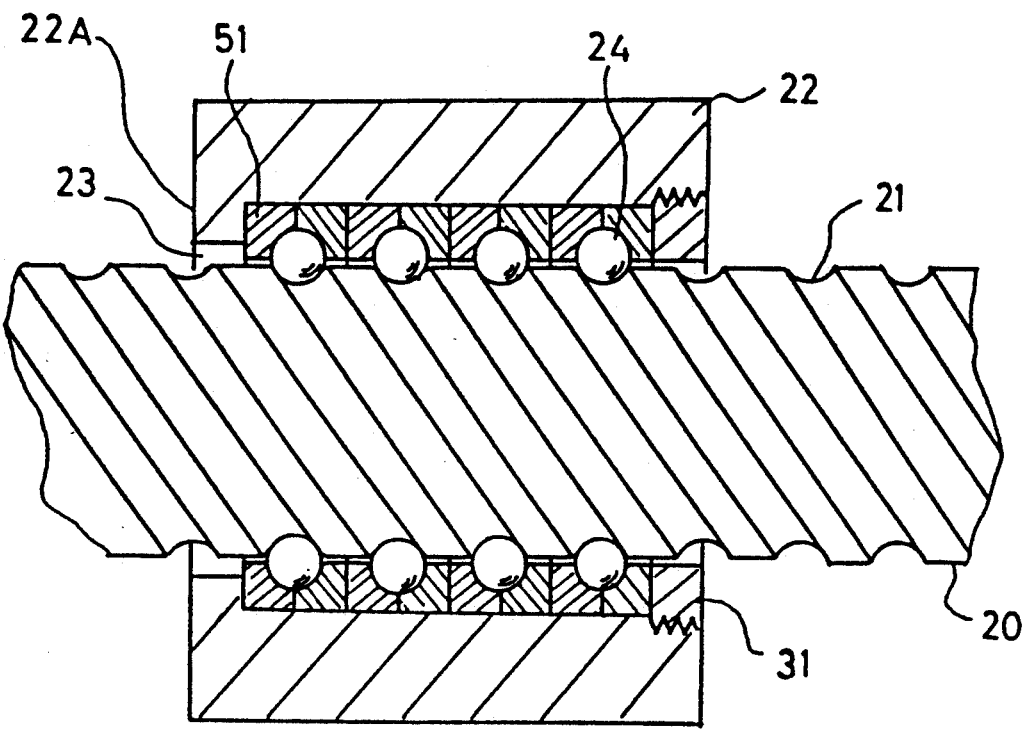
FIG.6
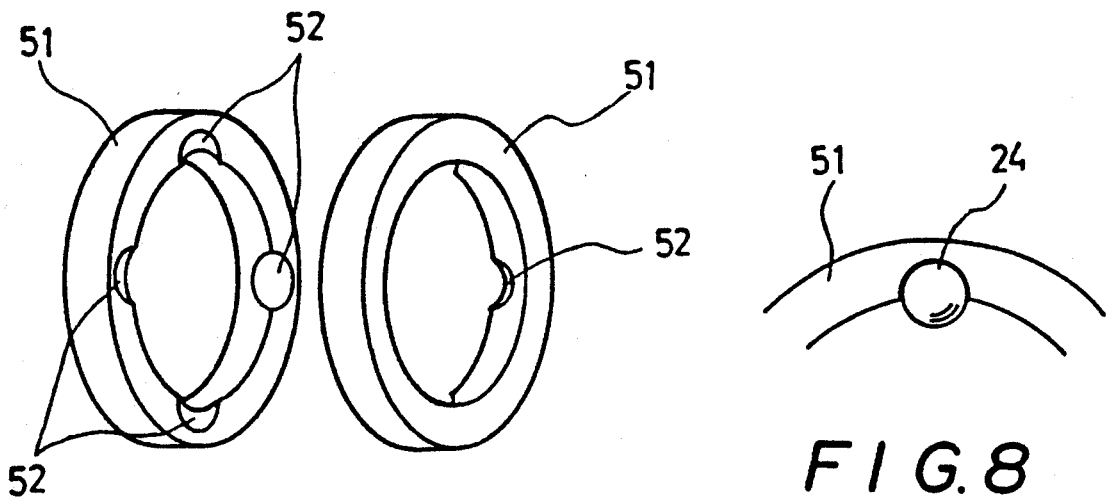
FIG.7
FIG.8

5,241,874

BALL SCREW

This is a continuation of application Ser. No. 07/750,610, filed Aug. 27, 1991, now abandoned.

BACKGROUND OF THE INVENTION

The present invention relates to a ball screw used as a feed screw for use with machine tools, presses, steering gears for automobiles, carrying devices, elevating devices and so forth.

Generally, in machine tools or the like, it is necessary to transform rotary motion into linear motion. Such transformation needs to be carried out efficiently and accurately.

Conventionally, a ball screw accomplishes this. Japanese Patent Laid-Open No. 242866/1989 discloses a ball screw having screw shaft with spiral grooves formed in its outer circumference. The screw shaft is rotatably retained by a bearing relative to a rotating main body. This bearing includes balls, a retainer for retaining the balls at certain intervals, and an outer ring for guiding the balls. The retainer is not secured to any of the outer ring, rotating main body, or screw shaft.

Where there is no slippage between the outer ring and the balls, one rotation of the screw shaft accurately advances the screw shaft by a distance equal to one pitch of the groove thereof. However, where a great magnitude of force is imparted to the balls of the bearing by abruptly stopping the rotation of the screw shaft, slippage occurs between the outer ring and the balls. This causes the balls to move along the grooves of the screw shaft, while the screw shaft axially moves such that its rotation relative to the rotating main body stops. When this occurs, it is not possible to accurately transform rotary motion into linear motion, or linear motion into rotary motion.

OBJECTS AND SUMMARY OF THE INVENTION

Accordingly, it is an object of the present invention to provide a ball screw that overcomes the drawbacks of the prior art.

It is a further object to provide a ball screw that is capable of accurately transforming rotary motion into linear motion.

It is a still further object of the invention to provide a ball screw capable of accurately transforming linear motion into rotary motion.

Briefly stated, the present invention provides a ball screw incorporating a screw shaft having a plurality of spiral grooves around its circumference. The spiral grooves are engaged by a plurality of balls in assembly units. The balls in each assembly unit are disposed in a plane that is normal to a longitudinal axis of the screw shaft. Each assembly unit retains its plurality of balls at predetermined rotational positions relative to the bearing main body. In one embodiment, the screw shaft includes two spiral threads, there are two assembly units, each carrying two balls disposed 180 degrees from each other, and the two assembly units are spaced axially to place the balls in one assembly unit at an angle of 90 degrees to the balls in the other assembly unit.

According to an embodiment of the invention, there is provided a ball screw comprising: a screw shaft, at least one spiral groove in an outer circumference of the screw shaft, a bearing main body, at least two assembly units in the main bearing body, a plurality of balls in each of the at least two assembly units, the screw shaft extending through the assembly units, the plurality of balls engaging the at least one spiral groove, and the at least two assembly units including means for rotatably retaining the plurality of balls at predetermined positions relative to the bearing main body and for allowing the bearing main body to support the screw shaft by the plurality of balls.

According to a feature of the invention, there is provided a ball screw comprising: a screw shaft, at least two spiral grooves in the screw shaft, a bearing main body, a plurality of assembly units in the bearing main body, the plurality of assembly units being equal in number to the at least two spiral grooves, a plurality of balls disposed in each of the assembly units, the plurality of balls in each assembly unit being disposed in a plane that is normal to a longitudinal axis of the screw shaft, and in each of the assembly units, each of the plurality of balls engages a different one of the plurality of grooves.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6 is a longitudinal cross section of a ball screw according to a third embodiment of the present invention.

FIG. 7 is a perspective view showing a pair of annular members of the embodiment of the invention in FIG. 6.

FIG. 8 is a front view showing a ball installed in a concave recess of the annular members shown in FIG. 6.

DETAILED DESCRIPTION OF THE INVENTION

Figure 1:
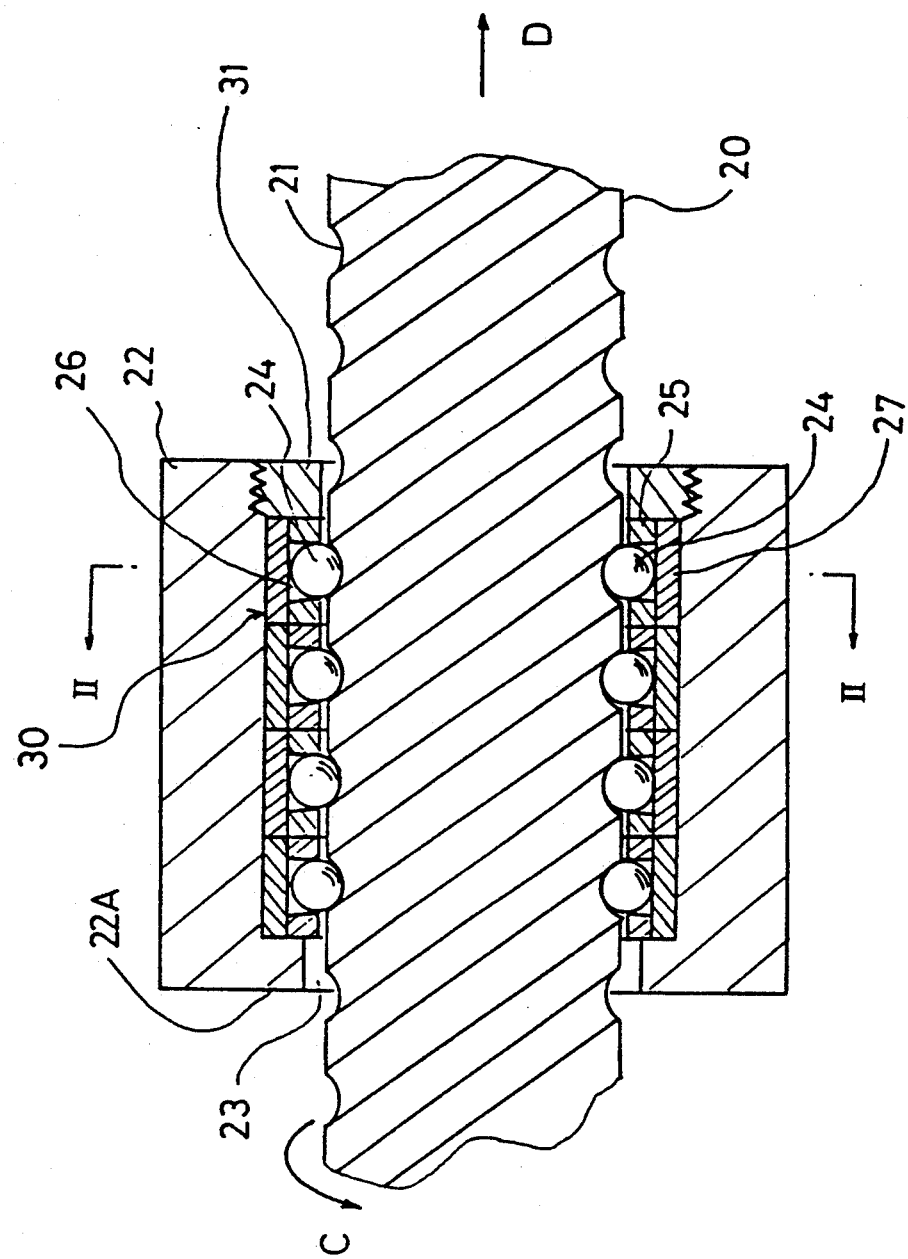
FIG. 1 is a longitudinal cross section ball screw according to an embodiment of the present invention.
Figure 2:
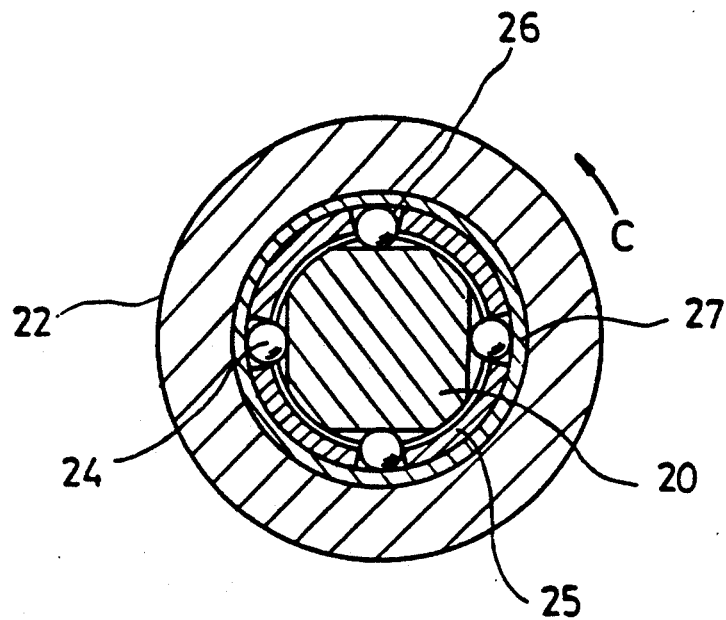
FIG. 2 is a cross section taken along the line II—II of FIG. 1.

As shown in FIGS. 1 and 2, a cylindrical screw shaft 20 having four spiral grooves 21 in its outer circumference is rotatably inserted through a circular opening 23 in a bearing main body 22. A diameter of one end of circular opening 23 is smaller than the diameter at other portions thereof by a protrusion 22A of bearing main body 22. An inner ring is fitted in an outer ring 27. Four circular openings 26 in inner ring 25 are positioned at quarter positions on an inner circumference of inner ring 25. One of balls 24 is installed in each respective circular opening 26. The outer exits of circular openings 26 are closed by outer ring 27. Balls 24 installed in circular openings 26 are free to rotate therein. There are four sets of assembly units 30, each comprising inner ring 25, balls 24 in circular openings 26 of inner ring 25, and outer ring 27, in which inner ring 25 is fitted. These assembly units 30 are assembled parallel to each other in circular opening 23. A portion of each ball 24 protrudes from inner ring 25 into one of the four grooves 21 of screw shaft 20. That is, the four balls in each ring engages a different one of the four grooves 21.

Figure 3:
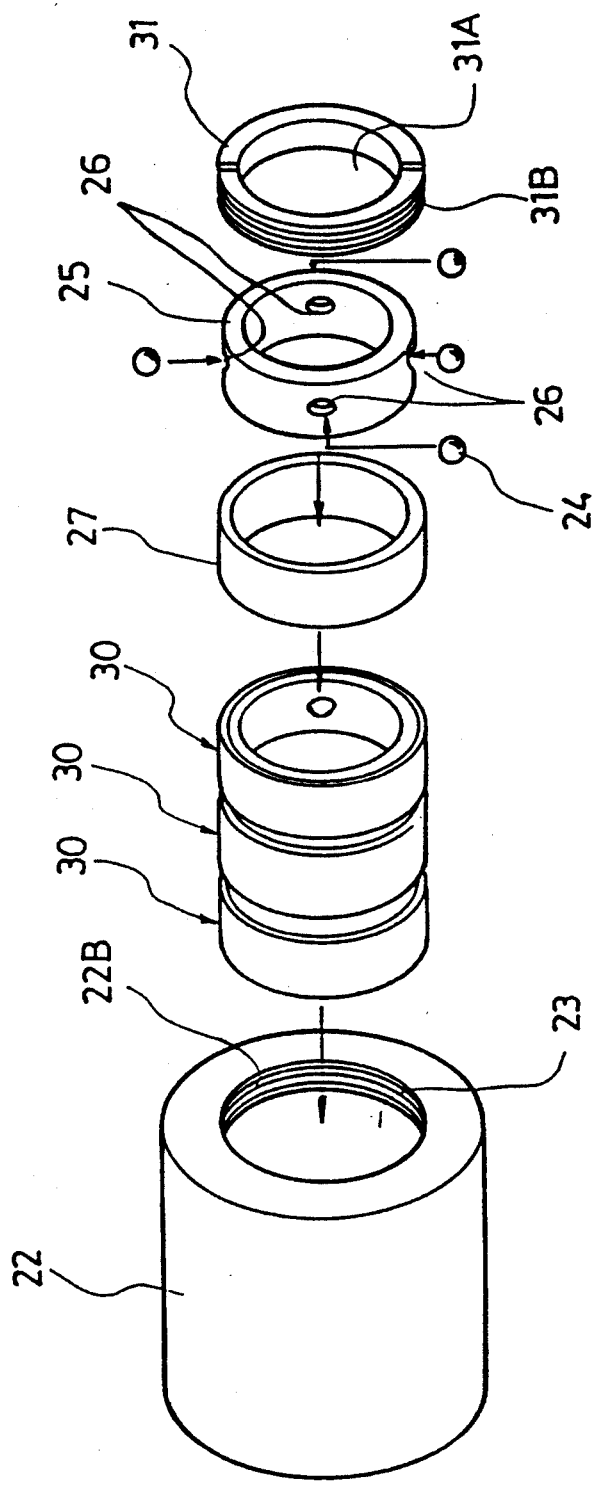
FIG. 3 is an exploded perspective view showing the assembly of the first embodiment.

Referring to FIG. 3, an annular nut 31 has a circular opening 31A through which screw shaft 20 extends, and threads 31B in its outer circumference. Threads 22B in the inner circumference of circular opening 23 on a second end of bearing main body 22 engage threads 31A of annular nut 31.

Screw shaft 20 (FIG. 1) extends through circular opening 31A of annular nut 31. Annular nut 31 is tightened to urge the stack of four assembly units 30 against protrusion 22A of bearing main body 22.

A preferred embodiment is assembled as follows: First, four balls 24 are inserted into circular openings 26 of inner ring 25 from outside of inner ring 25, and fits inner ring 25 into outer ring 27, preparing four assembly units 30. The four sets of assembly units 30 are fitted into circular opening 23 of bearing main body 22. Following this, annular nut 31 is threaded into bearing main body 22.

Next the screw shaft 20, shown in FIGS. 1 and 2, is inserted into circular opening 23 of bearing main body 22. This secures balls 24 in grooves 21, respectively, and screw shaft 20 is supported by balls 24 in bearing main body 22.

In this embodiment, the combination of inner ring 25, balls 24, outer ring 27, and annular nut 31 retains each ball 24.

In operation, where bearing main body 22 is fixed, when screw shaft 20 is rotated in the direction C as shown in FIGS. 1 and 2, balls 24 remain in the same position at all times, and screw shaft 20 advances in the direction D as shown in FIG. 1 while rotating in the direction C. In this state, even if a large force is applied abruptly to screw shaft 20, balls 24 remain in position; only screw shaft 20 rotates. Balls 24 do not move relative to bearing main body 22 or screw shaft 20. Due to this, the number of rotations of screw shaft 20 accurately corresponds to the distance that screw shaft 20 moves in direction D.

According to the embodiment, because inner ring 25 and outer rings 27 are simple in design, they are easy to produce. In addition, it is simple to assemble and disassemble the invention.

Although the above embodiment of the invention employs four balls 24 accommodated in each assembly unit 30, with each ball engaging one of four spiral grooves 21, this number may be changed. One effect of varying the number of balls 24 in assembly units 30 is a change in load resistance. It would be clear that, an increase or decrease in the number of balls 24 in assembly units 30 requires a corresponding increase or decrease in the number of spiral grooves 21.

Figure 4:
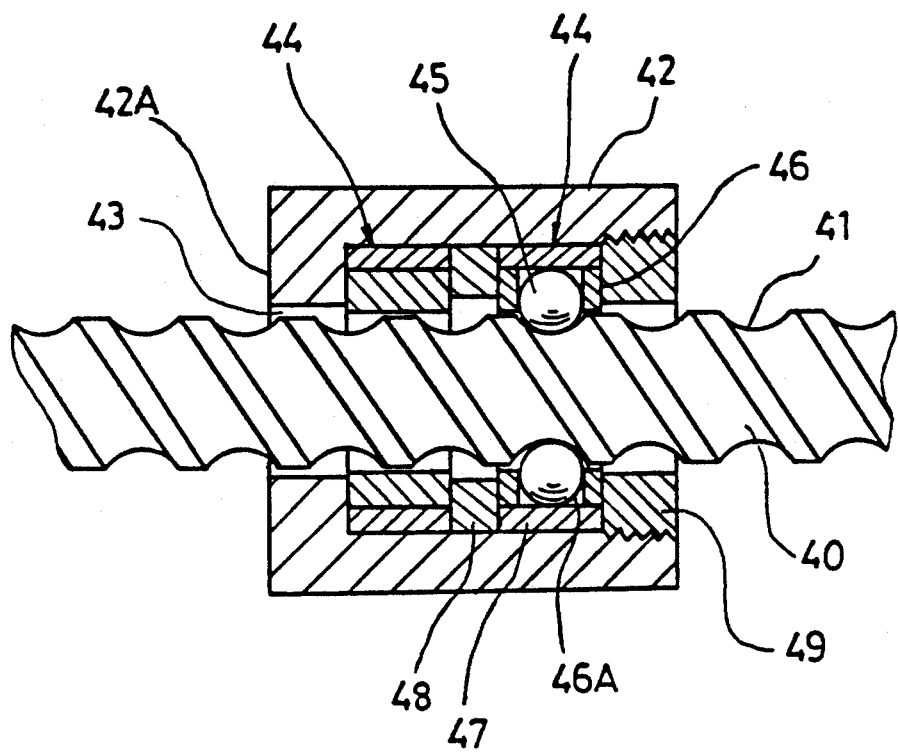
FIG. 4 is a longitudinal cross section of a ball screw according to a second embodiment of the invention.

FIG. 4 is a longitudinal cross section of a second embodiment of the present invention. In this embodiment, two spiral grooves 41 are formed in an outer circumference of a screw shaft 40, and a bearing main body 42 has a circular opening 43 through which screw shaft 40 extends. Similar to the first embodiment, a protrusion 42A on bearing main body 42 reduces the diameter of one end of circular opening 43 compared to the remainder thereof. In this embodiment, two assembly units 44 correspond to assembly units 30 of the first embodiment. Each assembly unit 44 contains two balls 45 diametrically opposed in circular openings 46A of an inner ring 46. Inner rings 46 are fitted into respective outer rings 47. These two assembly units 44 are fitted in circular opening 43.

Figure 5:
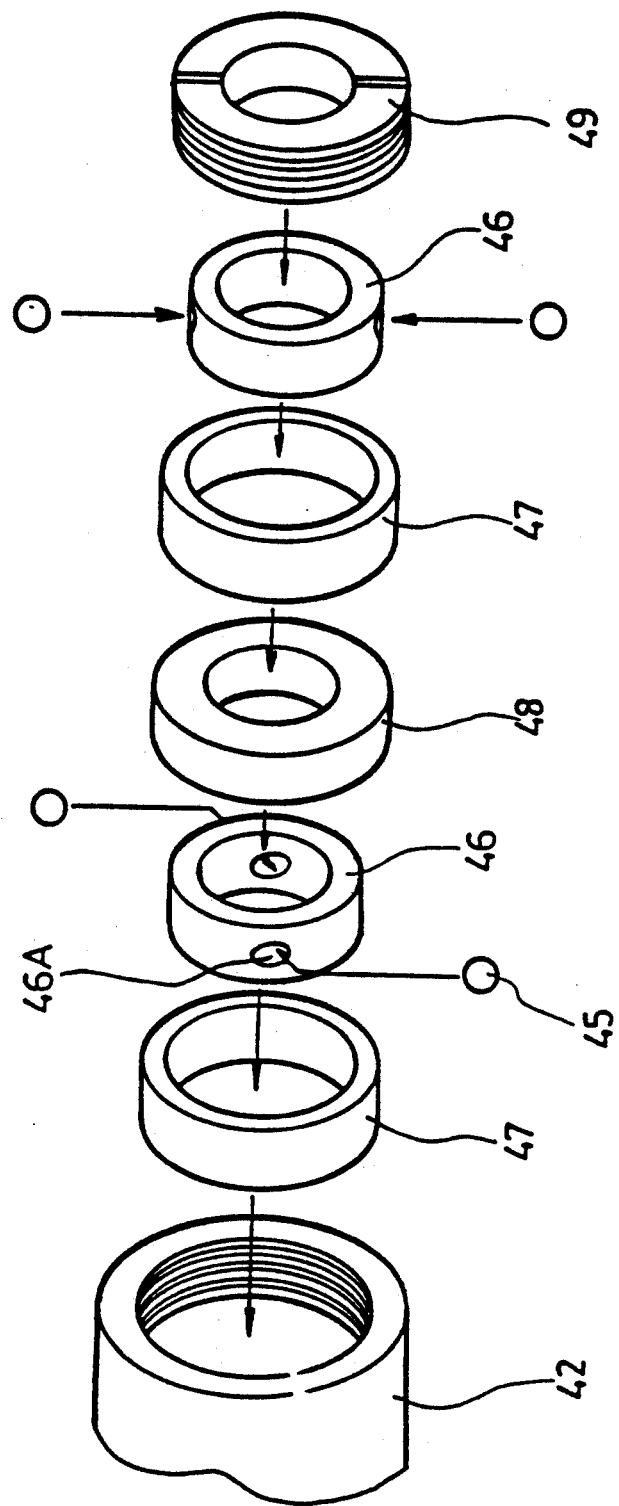
FIG. 5 is an exploded perspective view showing the assembly of the second embodiment.

A tubular spacer 48 is interposed between the two assembly units 44 to space assembly units 44 so that balls 45 of one assembly are rotated 90 degrees from balls 45 of the second assembly. Due to this 90-degree angular displacement between balls 45 of the two assembly units, balls 45 uniformly support screw shaft 40 from four sides on surfaces normal to the axial direction of screw shaft 40. Assembly units 44 and tubular spacer 48 are secured in bearing main body 42 by annular nut 49 which presses them, and tubular spaces against protrusion 42A. Annular nut 49 is similar to annular nut 31 in the first embodiment (FIG. 1). FIG. 5 is an exploded perspective view showing the second embodiment whose assembly procedure is the same as that of the first embodiment.

In the second embodiment, the combination of inner ring 46, outer ring 47, and annular nut 49 retains each ball 45.

The construction of the second embodiment is simple and the number of constituent components small.

FIG. 6 shows a further embodiment of the present invention. In the third embodiment, as in the first embodiment shown in FIGS. 1 to 3, screw shaft 20, having four grooves 21 formed therein, is supported on bearing main body 22 by balls 24. The difference between the third and first embodiments is the structure of the means for retaining balls 24. A pair of annular members 51 each includes four concave recesses 52 therein. The concave recesses 52 of annular members 51 face each other to form four pockets, each capable of retaining one ball 24. Annular members 51 are identical. A mated pair of annular members 51 is formed by flipping one annular member 51 relative to another annular member 51.

Referring to FIG. 8, each concave recess 52 is semispheric with a radius of curvature corresponding to that of ball 24. When ball 24 is fitted in concave recess 52, a part of ball 24 protrudes from the inner circumferential surface of annular member 51. Four pairs of annular members 51 for retaining balls 24 are assembled parallel to each other in circular opening 23 of bearing main body 22, and are pressed towards protrusion 22A of bearing main body 22 by annular nut 31 as described for the first embodiment.

In the third embodiment, the combination of a mated pair of annular members 51 and annular nut 31 retains four ball 24.

Construction of the third embodiment is simple and the number of constituent components small, making the assembly and disassembly of the device easy.

In present invention, when a great magnitude of force is applied axially to the screw shaft, retainers hold the balls at predetermined positions relative to the bearing main body. That is, the balls do not move relative to the bearing main body. Therefore, the axial rotation movement of the screw shaft relative to the bearing main body is stopped. The net effect is that this invention makes it possible accurately and efficiently to transform rotary motions into linear motions, and linear motions into rotary motions.

As in prior embodiments, more or less than four balls 24 could be accommodated in an appropriate number of concave recesses 52 of annular members 51. Such a change, of course, requires a corresponding change in the number of annular members and spiral grooves 21 in screw shaft 20, as well as requiring suitable spacers to control the angular relationships of balls 24 in successive annular members.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball screw comprising:

a cylindrical screw shaft having a plurality of spiral grooves in an outer circumference thereof; and a bearing disposed on said shaft, said bearing including:

a hollow, cylindrical main body having an inwardly turned flange at one end thereof;

a plurality of assembly units disposed within said main body; and a locking member locking said assembly units against said flange;

each of said assembly units comprising a plurality of spherical balls and means for rotatably retaining said balls in a fixed spatial relation to said main body;

said means for retaining said balls comprising:

an annular outer ring in each of said assembly units; and an annular inner ring disposed within each of said outer rings, said inner rings each including a plurality of regularly spaced circular openings in which respective ones of said plurality of balls are retained;

the number of said balls in each of said assembly units being equal to the number of said spiral grooves, with one of said balls engaging said shaft in each of said spiral grooves, said balls all lying within a single plane perpendicular to an axis of said shaft;

whereby said bearing rotatably supports said shaft by said plurality of balls.

2. The ball screw of claim 1, wherein:

said plurality of assembly units includes first and second assembly units;

said plurality of balls in each of said assembly units consists of two balls, spaced 180 degrees apart; and said first and second assembly units are axially spaced, relative to said shaft, so as to position said two balls in said first assembly units at tangential positions angularly spaced 90 degrees from angular positions of said two balls in said second assembly units.

3. The ball screw of claim 1, wherein said plurality of assembly units are axially spaced, relative to said shaft, such that said plurality of balls in a one of said assembly units is angularly offset relative to said plurality of balls in an adjacent assembly unit.

* * * * *